United States Patent
Jeon et al.

(10) Patent No.: US 12,258,526 B2
(45) Date of Patent: Mar. 25, 2025

(54) MANUFACTURING METHOD AND MANUFACTURING APPARATUS OF SYNGAS, AND MANUFACTURING METHOD OF LIQUID HYDROCARBON USING THE SAME

(71) Applicant: SK Innovation Co., Ltd., Seoul (KR)

(72) Inventors: Hee Jung Jeon, Daejeon (KR); Ok Youn Kim, Daejeon (KR); Dong Min Yun, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 18/414,904

(22) Filed: Jan. 17, 2024

(65) Prior Publication Data
US 2024/0301307 A1 Sep. 12, 2024

(30) Foreign Application Priority Data
Mar. 9, 2023 (KR) .................. 10-2023-0031022

(51) Int. Cl.
*C10K 1/00* (2006.01)
*C10J 3/48* (2006.01)
(Continued)

(52) U.S. Cl.
CPC .............. *C10K 1/005* (2013.01); *C10J 3/482* (2013.01); *C10J 3/84* (2013.01); *C10K 3/003* (2013.01); *C10K 3/026* (2013.01); *C10K 3/04* (2013.01); *C10K 3/06* (2013.01); *C10J 2300/0946* (2013.01); *C10J 2300/0976* (2013.01);
(Continued)

(58) Field of Classification Search
CPC .................................................... C10K 1/005
See application file for complete search history.

(56) References Cited

U.S. PATENT DOCUMENTS

| 5,457,250 A | 10/1995 | Gerhardus et al. |
| 10,166,521 B2 | 1/2019 | Kuhl |

(Continued)

FOREIGN PATENT DOCUMENTS

| CN | 114340789 A | 4/2022 |
| EP | 2584023 A1 | 4/2013 |

(Continued)

OTHER PUBLICATIONS

Moon et al. (English machine translation of KR 102097283 B1). (Year: 2020).*

*Primary Examiner* — Peter F Godenschwager
(74) *Attorney, Agent, or Firm* — The Webb Law Firm

(57) ABSTRACT

Provided are a method for manufacturing syngas including the steps of (S1) heat-treating organic waste in a first reactor to produce a first mixed gas; (S2) introducing the first mixed gas to a second reactor and subjecting it to methane reforming in the presence of a catalyst to produce a second mixed gas; (S3) separating the catalyst and carbon dioxide from the second mixed gas and recovering a third mixed gas from which the catalyst and the carbon dioxide have been removed; (S4) converting the carbon dioxide separated in step (S3) into carbon monoxide through a reverse Boudouard reaction in a third reactor; and (S5) mixing the third mixed gas recovered in step (S3) and the carbon monoxide converted in step (S4) to produce syngas, and an apparatus for manufacturing syngas.

12 Claims, 2 Drawing Sheets

(51) Int. Cl.
*C10J 3/84* (2006.01)
*C10K 3/00* (2006.01)
*C10K 3/02* (2006.01)
*C10K 3/04* (2006.01)
*C10K 3/06* (2006.01)

(52) U.S. Cl.
CPC .............. *C10J 2300/0986* (2013.01); *C10J 2300/1618* (2013.01); *C10J 2300/1696* (2013.01); *C10J 2300/1807* (2013.01)

(56) References Cited

U.S. PATENT DOCUMENTS

| | | |
|---|---|---|
| 10,876,057 B1 | 12/2020 | Geinoz et al. |
| 10,927,007 B2 | 2/2021 | Bank et al. |
| 11,248,184 B2 | 2/2022 | Grainger et al. |
| 2007/0256359 A1 | 11/2007 | Wiltowski et al. |
| 2012/0241676 A1 | 9/2012 | Kim et al. |
| 2013/0203142 A1 | 8/2013 | Young |
| 2014/0206779 A1 | 7/2014 | Lackner et al. |
| 2015/0129805 A1 | 5/2015 | Karpenko et al. |
| 2015/0274524 A1 | 10/2015 | Fedorov et al. |
| 2021/0171846 A1 | 6/2021 | Hu et al. |
| 2023/0024777 A1 | 1/2023 | Elbashir et al. |
| 2024/0158229 A1 | 5/2024 | Jeon et al. |

FOREIGN PATENT DOCUMENTS

| | | |
|---|---|---|
| EP | 2673069 B1 | 4/2018 |
| EP | 3160899 B1 | 12/2018 |
| EP | 4382477 A1 | 6/2024 |
| KR | 100308464 B1 | 12/2001 |
| KR | 101493765 B1 | 2/2015 |
| KR | 101599374 B1 | 3/2016 |
| KR | 102097283 B1 | 4/2020 |
| WO | 2021211525 A1 | 10/2021 |
| WO | 2022084436 A1 | 4/2022 |

\* cited by examiner

MANUFACTURING METHOD AND MANUFACTURING APPARATUS OF SYNGAS, AND MANUFACTURING METHOD OF LIQUID HYDROCARBON USING THE SAME

CROSS-REFERENCE TO RELATED APPLICATION

This application claims priority to Korean Patent Application No. 10-2023-0031022 filed Mar. 9, 2023, the disclosure of which is hereby incorporated by reference in its entirety.

BACKGROUND OF THE INVENTION

Field of the Invention

The present disclosure relates to a method and an apparatus for manufacturing syngas, and in some embodiments, to a method and an apparatus for manufacturing syngas which may increase a manufacturing yield of syngas and minimize carbon dioxide emission. In some embodiments, the present disclosure relates to a method for manufacturing a liquid hydrocarbon from syngas manufactured by the method and/or the apparatus disclosed herein.

Description of Related Art

Organic waste may seriously damage the environment by decay when landfilled, and should be discarded through a prescribed treatment process after collecting by their properties when discarded. However, since simple disposal of the organic waste requires securing treatment facilities and consuming a large amount of manpower and is more wasteful than productive, methods and technologies for recycling organic waste have been developed in recent years. Representatively, a gasification process technology in which syngas is produced using organic waste and converted into a high value-added product for energization, may be mentioned.

The gasification process generally refers to a series of processes of reacting carbonaceous raw materials such as coal, organic waste, and/or biomass under the supply of water vapor, oxygen, carbon dioxide, or a mixture thereof to convert the raw materials into syngas including hydrogen and carbon monoxide, in which the "syngas" or "synthesis gas" refers to mixed gas which is usually produced by a gasification reaction and includes hydrogen and carbon monoxide and may further include carbon dioxide and/or methane.

The gasification process technology has expanded to a technology of producing fuels and raw materials of various compounds, and for example, the syngas may be used as the raw material of a Fischer-Tropsch synthesis reaction to manufacture high value-added products such as light oil, heavy oil, diesel oil, wax, jet oil, and/or lube oil. Besides, it is known that hydrogen in the syngas which is the main product of the gasification process is used to be applied to hydrogen power generation, ammonia manufacture, an oil refining process, and/or the like, and methanol manufactured from the syngas may be used to obtain high value-added chemicals such as acetic acid, olefin, dimethyl ether, aldehyde, fuel, and/or an additive.

Recently, as a process for manufacturing syngas, a gasification process using a catalyst has been carried out, but due to the formation of coke and the like in the gasification process, the catalyst is inactivated which causes process trouble in continuous operation. In addition, for securing economic feasibility, relatively expensive catalysts need to be recovered, but in order to recover catalyst discharged in the state in which coke is agglomerated, a plurality of subsequent processes (such as air burning) should be carried out, and thus, process efficiency is significantly deteriorated.

Since the conventionally performed gasification process of organic waste has a significantly low manufacturing yield of syngas which may be converted into a high value-added product of 30% or less and has poor productivity, commercialization using the process is limited. Further, in terms of environmental protection, it is preferred to suppress $CO_2$ emission, but since the gasification reaction product of organic waste contains $CO_2$ in addition to $H_2$ and $CO$, carbon dioxide emission is higher than that in landfill or pyrolysis treatment, and thus, the gasification process has a serious problem of rather causing more environmental pollution.

Thus, a method and an apparatus for manufacturing syngas which may increase a manufacturing yield of syngas which may be converted into a high value-added product and minimize carbon dioxide formation in the gasification process of organic waste are needed.

SUMMARY OF THE INVENTION

In some embodiments, the present disclosure provides a method and an apparatus for manufacturing syngas which have a significantly improved manufacturing yield of syngas from organic waste.

In some embodiments, the present disclosure provides a method and an apparatus for manufacturing syngas which may minimize carbon dioxide formation.

In addition, the technical objects to be achieved in the present disclosure are not limited to the above-mentioned technical objects, and other objects which are not mentioned may be clearly understood by those skilled in the art to which the present disclosure pertains from the following description.

In some embodiments, a method of manufacturing syngas comprises the steps of: (S1) heat-treating organic waste in a first reactor to produce a first mixed gas; (S2) introducing the first mixed gas to a second reactor and subjecting it to methane reforming in the presence of a catalyst to produce a second mixed gas; (S3) separating the catalyst and carbon dioxide from the second mixed gas and recovering a third mixed gas from which the catalyst and the carbon dioxide have been removed; (S4) introducing the carbon dioxide separated in step (S3) to a third reactor and converting the carbon dioxide into carbon monoxide through a reverse Boudouard reaction; and (S5) mixing the third mixed gas recovered in step (S3) and the carbon monoxide converted in step (S4) to produce syngas.

In some embodiments, the methane reforming in step (S2) may comprise any one or two or more reactions selected from a methane pyrolysis reaction, a carbon dioxide reforming reaction, and/or a water vapor reforming reaction.

In some embodiments, the first mixed gas may comprise methane, hydrogen, carbon monoxide, and/or carbon dioxide.

In some embodiments, the second mixed gas may comprise hydrogen, carbon monoxide, and/or carbon dioxide.

In some embodiments, the catalyst in step (S2) may comprise or be a composite catalyst in which a metal hydride is supported on a carrier.

In some embodiments, the metal hydride may comprise any one or two or more selected from nickel, vanadium, iron, platinum, palladium, or ruthenium.

In some embodiments, the carrier may comprise silica, alumina, silica-alumina, carbon, zirconia, titania, zeolite, SAPO, ALPO, and/or mixtures thereof.

In some embodiments, step (S4) may further comprise (S4-1) introducing the catalyst separated in step (S3) to the third reactor and regenerating the catalyst through a reverse Boudouard reaction; and (S4-2) recirculating the regenerated catalyst to step (S2) and resupplying it.

In some embodiments, step (S2) may be performed at a temperature of 500 to 1000° C. and/or a pressure of 50 to 300 kPa.

In some embodiments, step (S4) may be performed at a temperature of 600 to 1000° C. and/or a pressure of 50 to 300 kPa.

In some embodiments, step (S6) may further comprise performing a water-gas shift reaction.

In some embodiments, the gas produced in (S5) may comprise hydrogen and carbon monoxide and a molar ratio between the hydrogen and the carbon monoxide may satisfy 1.8:1 to 2.2:1.

In some embodiments, the organic waste in step (S1) may be any one or two or more selected from waste plastic, solid waste, biomass, waste oil or waste tires, and/or standard plastic garbage bags.

In some embodiments, the first mixed gas of step (S1) may be purified before step (S2).

In some embodiments, an apparatus for manufacturing syngas comprises: a first reactor where organic waste is introduced and a gasification reaction is performed to produce a first mixed gas; a second reactor where the first mixed gas is introduced from the first reactor and a methane reforming reaction is performed under a catalyst to produce a second mixed gas; a carbon dioxide separation unit where the second mixed gas is introduced from the second reactor to separate carbon dioxide and a third mixed gas from which carbon dioxide has been removed is recovered; a third reactor where the separated carbon dioxide from the carbon dioxide separation unit is introduced and a reverse Boudouard reaction is performed; and a syngas production unit where the third mixed gas recovered from the carbon dioxide separation unit and converted carbon monoxide from the third reactor are mixed to produce syngas.

In some embodiments, the first reactor may comprise a fluidized bed reactor or a fixed bed reactor.

In some embodiments, the second reactor may comprise a fluidized bed reactor.

In some embodiments, the third reactor may comprise a fluidized bed reactor.

In some embodiments, a purification unit may be further comprised between the first reactor and the second reactor.

In some embodiments, the manufacturing apparatus of syngas may further comprise a cyclone into which a second mixed gas is introduced and the catalyst is separated between the second reactor and the third reactor; a supply line which supplies the separated catalyst from the cyclone to the third reactor; and a recirculation line which resupplies the regenerated catalyst from the third reactor to the second reactor.

Other features and aspects will be apparent from the following detailed description, the drawings, and the claims.

DETAILED DESCRIPTION OF MAIN ELEMENTS

Figure 1:
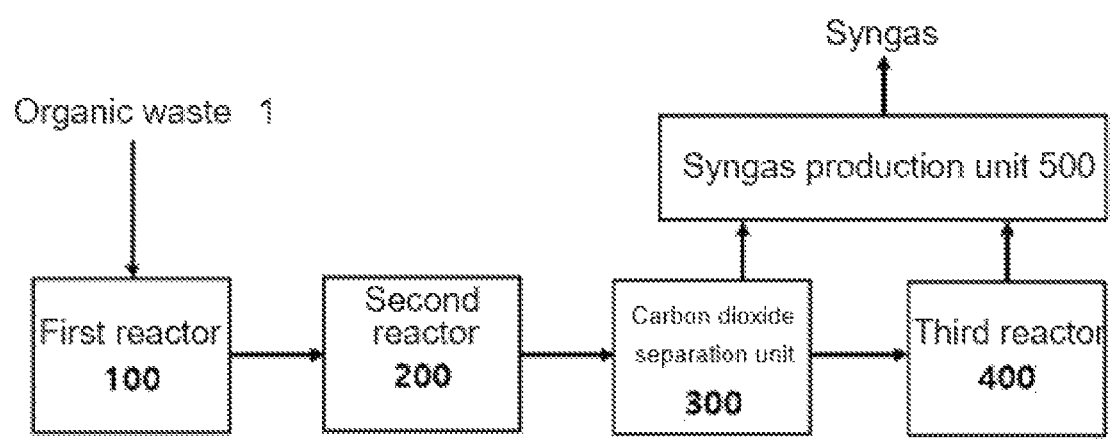
FIG. 1 illustrates a block diagram of a method for manufacturing syngas according to some embodiments of the present disclosure comprising a first reactor, a second reactor, a carbon dioxide separation unit, a third reactor, and a syngas production unit.

1: Organic waste
100: First reactor
200: Second reactor
300: Carbon dioxide separation unit
400: Third reactor
500: Syngas production unit
600: Purification unit
700: Cyclone
800: Fourth reactor

DESCRIPTION OF THE INVENTION

The singular form used in the present specification may be intended to also include a plural form, unless otherwise indicated in the context. As used herein, the singular form of "a", "an", and "the" include plural referents unless the context clearly states otherwise.

The numerical range used in the present specification includes all values within the range including the lower limit and the upper limit, increments logically derived in a form and spanning in a defined range, all double limited values, and all possible combinations of the upper limit and the lower limit in the numerical range defined in different forms. Unless otherwise defined in the present specification, values which may be outside a numerical range due to experimental error or rounding off of a value are also included in the defined numerical range.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

For the purposes of this disclosure, unless otherwise indicated, all numbers expressing quantities of ingredients, reaction conditions, dimensions, physical characteristics, and so forth used in the disclosure are to be understood as being modified in all instances by the term "about." Hereinafter, unless otherwise particularly defined in the present disclosure, "about" may be considered as a value within 30%, 25%, 20%, 15%, 10%, 5%, 3%, 2%, 1%, 0.5%, 0.1%, 0.05% or 0.01% of a stated value. Unless indicated to the contrary, the numerical parameters set forth in this disclosure are approximations that can vary depending upon the desired properties sought to be obtained by the present invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms such as "comprise", "include", "contain", "have", "may be", and "be provided with" mean that there is a characteristic or a constitutional element described in the specification, and as long as it is not particularly limited, a possibility of adding any one or two or more other characteristics or constitutional elements is not excluded in advance.

The unit of ppm used without particular definition in the present specification refers to ppm by mass.

A boiling point used without particular definition in the present specification refers to a boiling point at 25° C. under 1 atm.

A density used without particular definition in the present specification refers to a density at 25° C. under 1 atm.

"Gasification" which is used without particular definition in the present specification refers to a thermal-chemical conversion process through a chemical structure change of a carbonaceous material in the presence of a gasifier (air, oxygen, steam, carbon dioxide, or a mixture thereof) in a broad sense.

A "water-gas shift reaction" (WGS) mentioned in the present specification refers to a reaction in which carbon monoxide and water vapor react to produce hydrogen and carbon dioxide.

"Syngas" or "Synthetic gas" mentioned in the present specification without particular definition refers to gas including hydrogen and carbon monoxide.

As a conventional process for manufacturing syngas, a gasification process using a catalyst is carried out, but due to the formation of coke and the like in the gasification process, the catalyst is inactivated which causes process trouble in continuous operation. In addition, for securing economic feasibility, relatively expensive catalysts need to be recovered, but in order to recover catalyst discharged in the state in which coke is agglomerated, a plurality of subsequent processes (such as air burning) should be carried out, and thus, process efficiency is significantly deteriorated.

Since the conventionally performed gasification process of organic waste has a significantly low manufacturing yield of syngas which may be converted into a high value-added product of 30% or less and has poor productivity, commercialization using the process is limited. Further, in terms of environmental protection, it is preferred to suppress $CO_2$ emission, but since the gasification reaction product of organic waste contains $CO_2$ in addition to $H_2$ and $CO$, carbon dioxide emission is higher than that in landfill or pyrolysis treatment, and thus, the gasification process has a serious problem of rather causing more environmental pollution.

Thus, in some embodiments, the present disclosure may provide a manufacturing method of syngas comprising the steps of: (S1) heat-treating organic waste in a first reactor to produce a first mixed gas; (S2) introducing the first mixed gas to a second reactor and subjecting it to methane reforming in the presence of a catalyst to produce a second mixed gas; (S3) separating the catalyst and carbon dioxide from the second mixed gas and recovering a third mixed gas from which the catalyst and the carbon dioxide have been removed; (S4) converting the carbon dioxide separated in step (S3) into carbon monoxide through a reverse Boudouard reaction in a third reactor; and (S5) mixing the third mixed gas recovered in step (S3) and the carbon monoxide converted in step ($4) to produce syngas. The method of manufacturing syngas comprising steps (S1) to (S5) may minimize carbon dioxide formation as compared with a conventional gasification process to prevent environmental pollution and also significantly improve a manufacturing yield of syngas from organic waste.

In some embodiments, in step (S1), organic waste is heat-treated in the first reactor to produce a first mixed gas, wherein a gasification reaction of the organic waste may occur. In some embodiments, any one or two or more gasification reactions selected from the following Reaction Formulae 1 to 4 may be involved in step (S1):

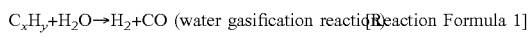

$C_xH_y+H_2O \rightarrow H_2+CO$ (water gasification reaction)     [Reaction Formula 1]

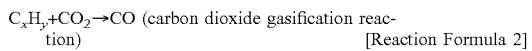

$C_xH_y+CO_2 \rightarrow CO$ (carbon dioxide gasification reaction)     [Reaction Formula 2]

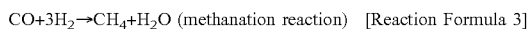

$CO+3H_2 \rightarrow CH_4+H_2O$ (methanation reaction)     [Reaction Formula 3]

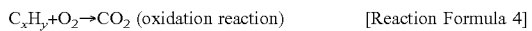

$C_xH_y+O_2 \rightarrow CO_2$ (oxidation reaction)     [Reaction Formula 4]

In some embodiments, the first mixed gas may comprise methane, hydrogen, carbon monoxide, and/or carbon dioxide. In addition, various impurities such as water vapor, nitrogen oxides, sulfur oxides, and hydrogen chloride may be present. In some embodiments, the first reactor may comprise a fluidized bed reactor or a fixed bed reactor.

In some embodiments, in order to increase a methane content in the composition of the first mixed gas, step (S1) may be performed under first catalyst conditions or non-catalytic conditions. In some embodiments, it may be advantageous to increase the methane content in the composition of the first mixed gas in terms of methane reforming reaction efficiency of step (S2) or a syngas manufacturing yield of step (S5). In order to increase the methane content in step (S1), an acid site catalyst or a molybdenum-based molded catalyst may be used as a bed material of a gasifier. When the catalyst is not used, the operation may be performed with an increased methane content under the operating conditions of the gasifier of low temperature and high pressure. The yield improvement effect of the reforming of step (S2) may be expected similarly from a C2 to C4 hydrocarbon gas content as well as the methane content, and the C2 to C4 gas content may also be increased by using the acid site catalyst or through low-temperature and high pressure gasification operation.

However, as the methane content is increased, a coke deposition amount may be increased in the catalyst of step (S2) in the methane reforming process, but coke deposition may be prevented in the reactor by a catalyst regeneration process through a reverse Boudouard reaction of step (S4-1) described later and a catalyst recirculation process of step (S4-2), eventually resulting in an excellent syngas manufacturing yield.

In some embodiments, the first catalyst may comprise or be an acid site catalyst or a molybdenum-based molded catalyst. The acid site catalyst may be a catalyst comprising a solid acid site derived from a structure or alumina. In some embodiments, the alumina may be alumina, silica-alumina, alumina dispersed in a carbon structure, and/or the like, and the structure acid site material may be zeolite, SAPO, AlPO, MOF, a structural variant thereof, and/or the like. The molybdenum-based catalyst refers to a catalyst in which molybdenum is supported on a carrier, and if necessary, nickel, cobalt, and/or the like may be added. In some embodiments, tungsten may be used instead of molybdenum. Any carrier may be used as long as it has durability so that is may support an active metal, and for example, it may comprise materials comprising any one or two or more selected from silica, alumina, silica-alumina, carbon, zirconia, and/or the like.

(S2) is a step of methane reforming the first mixed gas recovered in step (S1) under a catalyst in a second reactor, and may produce a second mixed gas comprising hydrogen, carbon monoxide, and/or carbon dioxide from the first mixed gas. In some embodiments, the second reactor may comprise a fluidized bed reactor. When the efficiency of the methane reforming reaction and catalyst regeneration described later are considered, it may be preferred to use a fluidized bed reactor, and the fluidized bed reactor may be a riser-type reactor or a bubble fluidized bed reactor.

In some embodiments, the methane reforming in step (S2) may involve any one or two or more reactions selected from a methane pyrolysis reaction, a carbon dioxide reforming reaction, and/or a water vapor reforming reaction. In some embodiments, any one or two or more reactions selected from the following Reactions Formulae 5 to 7 may be involved:

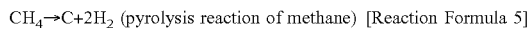
$$CH_4 \rightarrow C + 2H_2 \text{ (pyrolysis reaction of methane)} \quad [\text{Reaction Formula 5}]$$

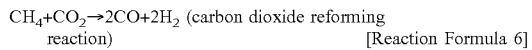
$$CH_4 + CO_2 \rightarrow 2CO + 2H_2 \text{ (carbon dioxide reforming reaction)} \quad [\text{Reaction Formula 6}]$$

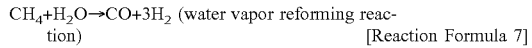
$$CH_4 + H_2O \rightarrow CO + 3H_2 \text{ (water vapor reforming reaction)} \quad [\text{Reaction Formula 7}]$$

In some embodiments, the methane pyrolysis reaction of step (S2) may be performed at a temperature of 400 to 1400° C. and/or a pressure of 30 to 2000 kPa.

In some embodiments, the carbon dioxide reforming reaction of step (S2) may be performed at a temperature of 600 to 1200° C. and/or a pressure of 30 to 2000 kPa.

In some embodiments, the water vapor reforming reaction of step (S2) may be performed at a temperature of 600 to 1400° C. and/or a pressure of 30 to 2000 kPa.

In some embodiments, step (S2) may be operated in the absence of a catalyst, but the catalyst may be used in order to increase a reaction conversion rate at a low temperature of 600 to 700° C. In some embodiments, the catalyst of step (S2) may be a composite catalyst in which a metal hydride is supported on a carrier. In some embodiments, the metal hydride may comprise any one or two or more selected from nickel, vanadium, iron, platinum, palladium, or ruthenium. As the metal hydride, commonly known metals such as nickel, vanadium, or iron may be used, and when the raw material such as organic waste has a low impurity content in the heat treatment process, a precious metal may be used. In some embodiments, the precious metal may be platinum, palladium, or ruthenium. In some embodiments, the carrier may be a solid acid material such as oxides or zeolite. In some embodiments, the carrier may be silica, alumina, silica-alumina, carbon, zirconia, titania, and/or the like.

Figure 3:
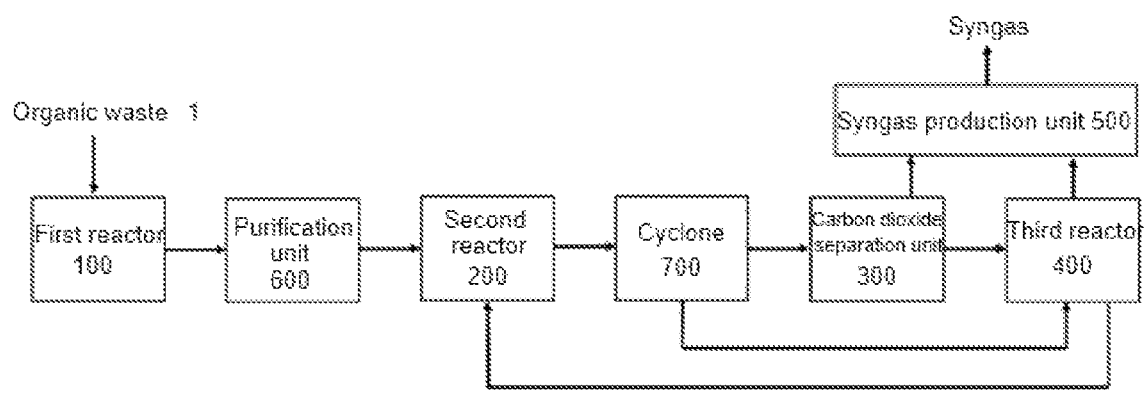
FIG. 3 illustrates a block diagram of a method for manufacturing syngas according to some embodiments of the present disclosure comprising a first reactor, a purification a unit, a second reactor, a cyclone, a carbon dioxide separation unit, a third reactor, a supply line, a recirculation line, and a syngas production unit.

(S3) is a step of recovering the third mixed gas, in which the catalyst and carbon dioxide are separated from the second mixed gas of step (S2) and the third mixed gas from which the catalyst and carbon dioxide have been removed may be recovered. When the catalyst and carbon dioxide are separated, in some embodiments it is preferred to separate the catalyst first and then separate carbon dioxide, but the present disclosure is not necessarily limited thereto, and the catalyst and carbon dioxide may be separated at the same time. Referring to FIG. 3, as described later, in some embodiments it may be preferred that a cyclone is provided between the second reactor and a carbon dioxide separation unit, so that the catalyst is separated from the second mixed gas of the second reactor, and then the product from which the catalyst has been separated is introduced to the carbon dioxide separation unit to separate carbon dioxide and recover the third mixed gas.

(S4) is a step of converting carbon dioxide separated in step (S3) into carbon monoxide through a reverse Boudouard reaction in the third reactor, in which carbon dioxide comprised in the first mixed gas of (S1) is not emitted to the outside, but converted into carbon monoxide, thereby preventing environmental pollution and simultaneously improving a manufacturing yield of syngas. The reverse Boudouard reaction may involve the reaction of the following Reaction Formula 8:

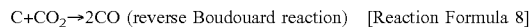
$$C + CO_2 \rightarrow 2CO \text{ (reverse Boudouard reaction)} \quad [\text{Reaction Formula 8}]$$

In some embodiments, carbon such as activated carbon may be supplied in order to perform the reverse Boudouard reaction well, and as another implementation, the reverse Boudouard reaction may be performed by using a catalyst inactivated by coke and/or the like in step (S1) as a carbon source or supplying coke from the outside.

In some embodiments, carbon monoxide converted by the reverse Boudouard reaction of (S4) may be used in the production of syngas in step (S5). When unreacted carbon dioxide is present in the product of step (S4), carbon dioxide is separated again from the product, and the reverse Boudouard reaction may be repeated once or more on the separated carbon dioxide. Accordingly, carbon dioxide may be converted into carbon monoxide in a very high yield.

(S5) is a step of producing syngas, in which the third mixed gas recovered in step (S3) and carbon monoxide converted in step (S4) may be mixed to produce syngas. The syngas refers to a gas comprising hydrogen and carbon monoxide as main components. As described later, the syngas may be used as a raw material of a Fischer-Tropsch reaction to manufacture high value-added products.

That is, in some embodiments, a manufacturing yield of syngas in a method of manufacturing syngas comprising a series of steps (S1) to (S5) may be maximized, and carbon dioxide emission may be minimized to prevent environmental pollution.

In some embodiments, step (S4) may further comprise step (S4-1) introducing the catalyst separated in step (S3) to the third reactor and regenerating the catalyst through a reverse Boudouard reaction; and (S4-2) recirculating the regenerated catalyst to (S2) and resupplying it. In some embodiments, the third reactor may comprise a fluidized bed reactor, and for example, a regenerator in the fluidized bed reactor. In a conventional gasification process, the catalyst is inactivated by a coke as a by-product in a methane reforming process which causes process troubles. In some embodiments, a certain amount of new catalyst is continuously exchanged with a waste catalyst to maintain a catalytic activity at a certain level or higher, but quality and process efficiency are deteriorated in the exchange process. Thus, in some embodiments, a double circulation fluidized bed process in which the reverse Boudouard reaction is performed by using the waste catalyst in which a coke and/or the like are deposited as a carbon source, and also the waste catalyst is regenerated and recirculated to the second reactor of step (S2) is implemented, thereby significantly improving process efficiency and a syngas manufacturing yield.

Separation of carbon dioxide in step (S3) may be performed using various carbon dioxide separation units. In some embodiments, it may be performed using an amine scrubber. Usually, the amine scrubber binds to and removes carbon dioxide by an amine-based material, and it may separate components such as carbon dioxide and hydrogen sulfide from gas steam and recover steam containing hydrogen, carbon monoxide, and/or inert gas. In some embodiments, the product is added from the second reactor to an amine solution at a temperature of 40 to 100° C. with a first amine scrubber to capture carbon dioxide, and is heated to 100 to 200° C. in a second amine scrubber to separate amine and carbon dioxide. When the amine scrubber described above is used, carbon dioxide may be separated at a lower temperature as compared with the case of using a CCS unit described later, and thus, it may be favorable in terms of process stability.

In some embodiments, separation of carbon dioxide may be performed using a carbon capture and storage (CCS) unit. The CCS unit may adsorb and separate carbon dioxide using an adsorbent comprising any one or two or more selected from calcium oxide, calcium hydroxide, dolomite, limestone, or trona. In some embodiments, the adsorbent may be calcium oxide. In some embodiments, the adsorption of carbon dioxide in the CCS unit may be performed at a temperature of 500° C. or higher and lower than 800° C. and/or a pressure of 30 to 500 kPa. Under the conditions, carbon dioxide adsorption efficiency may be excellent. In some embodiments, the temperature may be 500 to 700° C. and/or the pressure may be 50 to 150 kPa, or the temperature may be 550 to 650° C. and/or the pressure may be 50 to 100 kPa. Carbon dioxide adsorbed by the adsorbent in the CCS unit is desorbed again and the desorption may be performed at a temperature of higher than 500° C. and 1000° C. or lower and/or a pressure of 30 to 500 kPa. Under the conditions, carbon dioxide desorption efficiency may be excellent. In some embodiments, the temperature may be 700 to 950° C. and/or the pressure may be 50 to 150 kPa, or the temperature may be 850 to 950° C. and/or the pressure may be 50 to 100 kPa.

In some embodiments, step (S1) may be performed at a temperature of 500 to 1400° C. and/or a pressure of 50 to 700 KPa. In some embodiments, the temperature may be 550 to 1200° C. and/or the pressure may be 70 to 500 kPa, or the temperature may be 600 to 1000° C. and/or the pressure may be 90 to 400 kPa.

In some embodiments, step (S2) may be performed at a temperature of 500 to 1000° C. and/or a pressure of 50 to 500 kPa.

In some embodiments, the reverse Boudouard reaction of step (S4) may be performed at a temperature of 600 to 1000° C. and/or a pressure of 50 to 500 kPa. Under the conditions, the conversion efficiency from carbon dioxide into carbon monoxide and the catalyst regeneration efficiency may be excellent. In some embodiments, the temperature may be 600 to 950° C. and/or the pressure may be 50 to 500 Pa, or the temperature may be 700 to 900° C. and/or the pressure may be 50 to 300 kPa.

(S5) is a step of producing syngas, in which the third mixed gas recovered in step (S3) and carbon monoxide converted in step (S4) may be mixed to produce syngas. As described above, the syngas may be used as a raw material of the Fischer-Tropsch reaction and converted into high value-added products such as light oil, heavy oil, diesel oil, jet oil, and/or lube oil, and when a stoichiometrically required molar ratio of $H_2$:CO satisfies 1.8:1 to 2.2:1, conversion efficiency may be excellent.

In some embodiments, step (S6) may further comprise performing a water-gas shift reaction. For example, the water-gas shift reaction may be performed after step (S5). In order to satisfy the molar ratio of $H_2$:CO, the water-gas shift (WGS) reaction may be performed in the front stage of the Fischer-Tropsch process, after step (S5). An impurity purification process may be performed together. When hydrogen is relatively insufficient in the composition of the syngas produced in step (S5) depending on the kind of organic waste, the water-gas shift reaction may be performed to supplement hydrogen.

In some embodiments, the gas produced in step (S5) may comprise hydrogen and carbon monoxide and a molar ratio between the hydrogen and the carbon monoxide may satisfy 1.8:1 to 2.2:1. In some embodiments, the WGS reaction may be performed in the conditions of 20 to 70 bar and/or 100 to 250° C. under a catalyst. The catalyst may be used without limitation as long as it is a catalyst having WGS reaction activity, and in some embodiments, may be a Cu—Zn mixed catalyst. In some embodiments, since carbon dioxide produced by the water-gas shift reaction is converted into carbon monoxide by the reverse Boudouard reaction, the environmental pollution problem caused by performing the conventional water-gas shift reaction may be solved and simultaneously the effect of improving a manufacturing yield of syngas may be promoted. In some embodiments, the molar ratio of $H_2$:CO may be 1.9:1 to 2.1:1, or 1.95:1 to 2.05:1.

In some embodiments, the molar ratio between the hydrogen and the carbon monoxide may be adjusted by controlling the reverse Boudouard reaction depending on a flow rate of the carbon monoxide converted in step (S4). A flow rate of the carbon monoxide converted in step (S4) may be measured in real time to control the reverse Boudouard reaction so that the molar ratio of $H_2$:CO is satisfied. Besides, flow rates of hydrogen and carbon monoxide in the second mixed gas recovered in step (S2) may also be measured to adjust the reaction conditions and the reaction speed of the reverse Boudouard reaction, thereby satisfying the molar ratio of $H_2$:CO.

In some embodiments, the molar ratio between the hydrogen and the carbon monoxide may be adjusted by supplying separate carbon dioxide to step (S4) depending on the flow rate of the carbon monoxide converted in step (S4). When CO is significantly small in the molar ratio of $H_2$:CO, separate carbon dioxide is supplied to step (S4), thereby improving the reverse Boudouard reaction activity to satisfy the molar ratio of $H_2$:CO to be 1.8:1 to 2.2:1. In some embodiments, the molar ratio of $H_2$:CO may be adjusted to 1.8:1 to 2.2:1, complementarily with the water-gas shift reaction of step (S6). The supply of carbon dioxide may be performed by a separate carbon dioxide storage unit.

In some embodiments, the organic waste in step (S1) may be any one or two or more selected from waste plastic, solid waste, biomass, waste oil, waste tires, standard plastic garbage bags, and/or construction waste. Without being necessarily limited thereto, any carbon-containing material such as biomass and/or coal may be used without limitation as the raw material of a gasification reaction, but considering the problem to be solved in the present disclosure, it may be appropriate to use the organic waste.

In some embodiments, before step (S2), the first mixed gas of step (S1) may be further purified. The first mixed gas produced in step (S1) may further comprise other components, for example, impurity gas such as water vapor, $H_2S$, HCl, HOCl, and/or $NH_3$, and/or fine dust, in addition to hydrogen, carbon monoxide, and carbon dioxide. By removing other components by the step of purifying the first mixed gas, quality and a manufacturing yield of syngas may be improved.

In some embodiments, the present disclosure may provide a manufacturing apparatus of syngas comprising: a first reactor where organic waste is introduced and a gasification reaction is performed to produce a first mixed gas; a second reactor where the first mixed gas is introduced from the first reactor and a methane reforming reaction is performed under a catalyst to produce a second mixed gas; a carbon dioxide separation unit where the second mixed gas is introduced from the second reactor to separate carbon dioxide and a third mixed gas from which carbon dioxide has been removed is recovered; a third reactor where the separated carbon dioxide from the carbon dioxide separation unit is introduced and a reverse Boudouard reaction is performed; and a syngas production unit where the third mixed gas recovered from the carbon dioxide separation unit and converted carbon monoxide from the third reactor are mixed to produce syngas. The syngas may be manufactured in a high yield from the organic waste by the manufacturing apparatus and carbon dioxide emission may be minimized to prevent environmental pollution. Thereafter, when a water-gas shift reaction and a Fischer-Tropsch process are linked, a process of purifying impurity gas may be added.

In some embodiments, the first reactor may comprise a fluidized bed reactor or a fixed bed reactor. The first reactor performs gasification by heat-treating organic waste, and may use the fluidized bed reactor or the fixed bed reactor without limitation. As described later, considering the use of the fluidized bed reactor as the second reactor and the third reactor, it may be advantageous to use the fluidized bed reactor in terms of process efficiency. The fluidized bed reactor may cause a gasification reaction by fluidizing and mixing in a state in which a solid layer (layer material) is suspended by reaction gas having an upward flow.

In some embodiments, the second reactor may comprise a fluidized bed reactor.

In some embodiments, the third reactor may comprise a fluidized bed reactor.

In some embodiments, it is preferred to use the fluidized bed reactor as the second reactor and the third reactor in terms of a catalyst regeneration process. In some embodiments, the second reactor may be a riser form or a bubble fluidized bed reactor form in the fluidized bed reactor, and the third reactor may be a regenerator in the fluidized bed reactor.

As shown in FIG. 1, organic waste 1 may be introduced into a first reactor 100 and heat-treated to perform a gasification reaction. The first mixed gas produced in the first reactor 100 may comprise methane, hydrogen, carbon monoxide, and carbon dioxide. The first mixed gas is introduced from the first reactor 100 to a second reactor 200 and a methane reforming reaction may be performed under a catalyst. In some embodiments, it is preferred to use gas at a high temperature produced in the first reactor 100 as it is in the second reactor 200 since energy efficiency may be increased, but when catalyst deactivation is severe by impurity gas in the first mixed gas, a purification process of impurity gas may be placed between the first reactor and the second reactor. The second mixed gas produced in the second reactor 200 is introduced to the carbon dioxide separation unit 300 to separate carbon dioxide, thereby recovering a third mixed gas from which carbon dioxide has been removed. The separated carbon dioxide may be introduced from the carbon dioxide separation unit 300 to the third reactor 400 and converted into carbon monoxide by the reverse Boudouard reaction. The third mixed gas recovered from the carbon dioxide separation unit 300 and the converted carbon monoxide from the third reactor 400 may be mixed in the syngas production unit 500 to produce the syngas. In some embodiments, when unreacted carbon dioxide remains in the product of the third reactor 400, the product may be introduced again to the carbon dioxide separation unit 300 to separate carbon dioxide from the product, and the separated carbon dioxide may be introduced again to the third reactor 400 to perform the reverse Boudouard reaction again. The process may be repeated once or more, thereby converting unreacted carbon dioxide into carbon monoxide to increase a carbon monoxide conversion rate.

Figure 2:
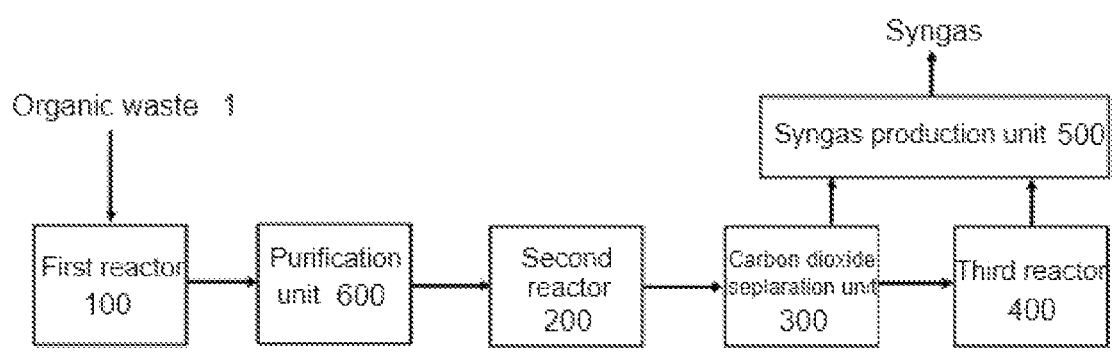
FIG. 2 illustrates a block diagram of a method for manufacturing syngas according to some embodiments of the present disclosure comprising a first reactor, a purification unit, a second reactor, a carbon dioxide separation unit, a third reactor, and a syngas production unit.

In some embodiments, a purification unit 600 may be further comprised between the first reactor 100 and the second reactor 200, as shown in FIG. 2. The purification unit 600 may be a dust collection filter for high temperature/high pressure or a wet scrubber, and may further improve a syngas manufacturing yield, by removing aqueous impurity gas components such as $H_2S$, HCl, HOCl, and/or $NH_3$.

In some embodiments, the apparatus for manufacturing syngas may further comprise a cyclone 700 which separates the catalyst from the product of the second reactor 200; a supply line which supplies the separated catalyst from the cyclone 700 to the third reactor 400; and a recirculation line which resupplies the regenerated catalyst from the third reactor 400 to the second reactor 200, as shown in FIG. 3. The catalyst separated in the cyclone 700 is introduced to the third reactor 400, in which the catalyst may comprise a coke component produced in the pyrolysis process of the organic waste. In some embodiments, the coke may be provided directly to the third reactor from the outside. Carbon dioxide may be introduced from the carbon dioxide separation unit 300 to the third reactor 400. In some embodiments, a separate carbon dioxide storage unit may be provided to introduce separate carbon dioxide. In some embodiments, the catalyst is treated with carbon dioxide at a high temperature of 700° C. or higher, thereby consequently removing impurities such as coke comprised in the catalyst and regenerating the catalyst. The regenerated catalyst may be reintroduced to the second reactor 200 through the recirculation line.

For the matters which are not described for the apparatus of manufacturing syngas, the above description of the method of manufacturing syngas may be referred.

In some embodiments, the present disclosure provides a manufacturing method of a liquid hydrocarbon comprising: supplying syngas to a fourth reactor 800; and performing a Fischer-Tropsch synthesis reaction in the fourth reactor 800, wherein the syngas is the syngas produced by any of the methods disclosed herein. The syngas produced through (S1) to (S5) is used as the raw material of the Fischer-Tropsch synthesis reaction represented by the following Reaction Formula 7, thereby manufacturing a liquid hydrocarbon. When the Fischer-Tropsch synthesis reaction is performed, in some embodiments it may be preferred to perform a process of purifying impurities in syngas.

$$nCO+2nH_2 \rightarrow C_nH_{2n}+nH_2O \qquad \text{[Reaction Formula 9]}$$

Figure 4:
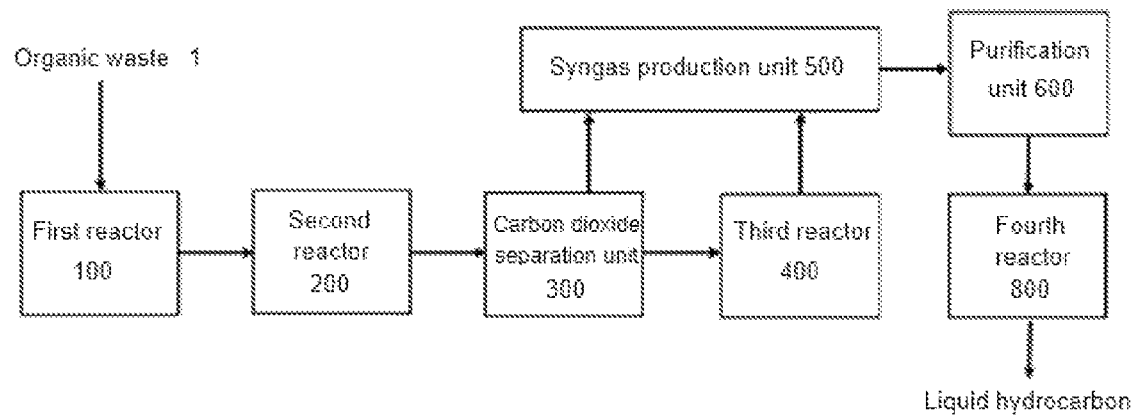
FIG. 4 illustrates a block diagram of a method for manufacturing syngas according to some embodiments of the present disclosure comprising a first reactor, a second reactor, a carbon dioxide separation unit, a third reactor, a syngas production unit, a production unit, and a fourth reactor.

FIG. 4 illustrates a block diagram of the manufacturing method of a liquid hydrocarbon. The fourth reactor 800 may be a Fischer-Tropsch synthesis reactor, in which the reactor may comprise a liquid product separation and heavy end recovery unit. In some embodiments, in order to improve a manufacturing yield of the liquid hydrocarbon, it is preferred that a stoichiometric molar ratio of $H_2$:CO satisfies 1.8:1 to 2.2:1, or 1.9 to 2.1, or 1.95 to 2.05.

In some embodiments, the liquid hydrocarbon may comprise naphtha having a boiling point of 150° C. or lower, kerosene having a boiling point of 150 to 265° C., and/or LGO having a boiling point of 265 to 340° C. The syngas produced in the conventional gasification process of organic waste has a low content of syngas ($H_2$, CO) which may be converted into a product (liquid hydrocarbon) and a lower molar mass of $H_2$ than $CO_2$ in $H_2$:CO, so that a recovery rate of the expected product is significantly lowered. The syngas produced by the steps of (S1) to (S5) of the present disclosure is used as the raw material of the Fischer-Tropsch synthesis reaction, thereby implementing an excellent recovery rate of the liquid hydrocarbon product as compared with the conventional gasification process of organic waste. In some embodiments, in order to obtain a high-quality liquid hydrocarbon, it is preferred to provide a purification unit 600 in the front stage of the Fischer-Tropsch synthesis reactor to perform the purification process.

Hereinafter, the present disclosure will be described in detail by the examples, however, the examples are for describing the present disclosure more detail, and the scope of rights is not limited to the following examples.

Example 1

A manufacturing apparatus of syngas was operated for 120 minutes to manufacture syngas. Specifically, 1000 g of municipal solid waste was added to a first reactor (fluidized bed reactor), and water vapor was introduced at a temperature of 1200° C. and a pressure of 250 kPa under alumina bead and a heat treatment was performed to recover a first mixed gas.

The first mixed gas was cooled, added to a purification unit (wet scrubber), and treated at 70° C. and 100 kPa to remove impurities and recover a purified first mixed gas.

the temperature was raised to 100° C. or higher in a second amine scrubber to separate amine and $CO_2$, and amine was recovered.

The separated carbon dioxide was added to a third reactor (fluidized bed reactor) and a reverse Boudouard reaction was performed to convert carbon dioxide into carbon monoxide. At this time, a catalyst in which active carbon and a coke were deposited and deactivated was added as a carbon source and a catalyst which was activated after removing the coke was added again to the first reactor.

The separated catalyst from the cyclone was supplied to the third reactor through a separate supply line and used as a coke source, and also treated together when performing the reverse Boudouard reaction to perform a regeneration process. Further, the regenerated catalyst was resupplied to the second reactor through a recirculation line connected to the second reactor, and unconverted $CO_2$ after the reaction was separately recovered through the amine scrubber.

A third mixed gas in which the catalyst had been separated from the cyclone and carbon dioxide had been separated from the amine scrubber, and carbon monoxide converted in the third reactor were introduced to a syngas production unit and mixed at 200° C. to manufacture $H_2$/CO syngas. The syngas manufactured in the syngas production unit was introduced to a water-gas shift reactor and a water-gas shift (WGS) reaction was performed to manufacture final syngas.

Each of the compositions of the purified first mixed gas, the second mixed gas, the syngas manufactured in the syngas production unit, and the final syngas which had undergone the WGS reaction is shown in the following Table 1.

The composition analysis method was performed by gas chromatography (GC), and a total gas amount was confirmed by a gas meter. Specifically, quantitation was performed by GC to calculate selectivity by gas, and each composition by gas was analyzed by the total gas amount confirmed by the gas meter.

TABLE 1

| | Composition of product (750° C.) | | | | | | | | |
|---|---|---|---|---|---|---|---|---|---|
| | Purified first mixed gas | | | Second mixed gas (second reactor) | | Syngas (Syngas production unit) | | Final syngas after undergoing WGS (WGS reactor) | |
| | mole | mole % | wt % | mole | wt % | mole | wt % | mole | wt % |
| $H_2$ | 4.83 | 32 | 2.55 | 6.59 | 3.64 | 6.59 | 6.09 | 9.26 | 7.88 |
| CO | 2.42 | 16 | 17.9 | 6.70 | 51.73 | 7.31 | 93.91 | 4.63 | 54.76 |
| $CH_4$ | 1.67 | 11 | 7.04 | 0.09 | 0.40 | — | — | — | — |
| $CO_2$ | 6.24 | 40 | 71.51 | 3.09 | 37.51 | — | — | 2.01 | 37.35 |
| $H_2O$ | 0 | | 0 | 1.35 | 6.72 | — | — | — | — |

The first mixed gas from which impurities had been removed was introduced to a second reactor (fluidized bed reactor) provided with a Ni/$Al_2O_3$ catalyst and treated at 750° C. and 250 kPa to perform a methane pyrolysis reaction, thereby manufacturing a second mixed gas.

The catalyst was separated from the second mixed gas of the second reactor using a cyclone, $CO_2$ was separated using an amine scrubber, and a third mixed gas from which the catalyst and carbon dioxide had been separated was recovered. Specifically, a reactant gas was added to an amine solution at 50° C. in a first amine scrubber to capture $CO_2$, Example 2

Syngas was manufactured in the same manner as in Example 1, except that a carbon dioxide reforming reaction was performed under the conditions of the second reactor of 900° C. and 250 kPa.

Each of the compositions of the purified first mixed gas, the second mixed gas, the syngas manufactured in the syngas production unit, and the final syngas which had undergone the WGS reaction is shown in the following Table 2.

TABLE 2

| | Purified first mixed gas | | | Second mixed gas (second reactor) | | Syngas (Syngas production unit) | | Final syngas after undergoing WGS (WGS reactor) | |
|---|---|---|---|---|---|---|---|---|---|
| | mole | mole % | wt % | mole | wt % | mole | wt % | mole | wt % |
| $H_2$ | 4.83 | 32 | 2.55 | 6.89 | 3.71 | 6.89 | 6.04 | 9.74 | 6.98 |
| CO | 2.42 | 16 | 17.9 | 7.10 | 53.54 | 7.72 | 93.96 | 4.87 | 48.46 |
| $CH_4$ | 1.67 | 11 | 7.04 | 0.02 | 0.09 | — | — | — | — |
| $CO_2$ | 6.24 | 40 | 71.51 | 3.01 | 35.59 | — | — | 2.85 | 44.56 |
| $H_2O$ | 0 | | 0 | 1.46 | 7.06 | — | — | — | |

Composition of product (900° C.)

Comparative Example 1

Syngas was manufactured in the same manner as in Example 1, except that the reverse Boudouard reaction was not performed by omitting the third reactor. The compositions of the purified first mixed gas, the second mixed gas, and the gas after WGS treatment are shown in the following Table 3:

TABLE 3

Composition of product (750° C.)

| | Purified first mixed gas | | | Second mixed gas (second reactor) | | Final syngas after undergoing WGS (WGS reactor) | |
|---|---|---|---|---|---|---|---|
| | mole | mole % | wt % | mole | wt % | mole | wt % |
| $H_2$ | 4.83 | 32 | 2.55 | 6.59 | 3.64 | 8.86 | 4.69 |
| CO | 2.42 | 16 | 17.9 | 6.70 | 51.73 | 4.43 | 32.85 |
| $CH_4$ | 1.67 | 11 | 7.04 | 0.09 | 0.40 | — | — |
| $CO_2$ | 6.24 | 40 | 71.51 | 3.09 | 37.51 | 5.36 | 62.46 |
| $H_2O$ | 0 | | 0 | 1.35 | 6.72 | — | |

Comparative Example 2

Syngas was manufactured in the same manner as in Example 2, except that the reverse Boudouard reaction was not performed by omitting the third reactor. The compositions of the purified first mixed gas, the second mixed gas, and the gas after WGS treatment are shown in the following Table 4:

TABLE 4

Composition of product (900° C.)

| | Purified first mixed gas | | | Second mixed gas (second reactor) | | Final syngas after undergoing WGS (WGS reactor) | |
|---|---|---|---|---|---|---|---|
| | mole | mole % | wt % | mole | wt % | mole | wt % |
| $H_2$ | 4.83 | 32 | 2.55 | 6.89 | 3.71 | 9.33 | 4.80 |
| CO | 2.42 | 16 | 17.9 | 7.10 | 53.54 | 4.66 | 33.55 |
| $CH_4$ | 1.67 | 11 | 7.04 | 0.02 | 0.09 | — | — |
| $CO_2$ | 6.24 | 40 | 71.51 | 3.01 | 35.59 | 5.45 | 61.65 |
| $H_2O$ | 0 | | 0 | 1.46 | 7.06 | — | — |

Evaluation Example

Referring to the results of composition analysis in Tables 1 and 2, in Examples 1 and 2, the final syngas which had undergone WGS had significantly increased $H_2$ and CO production amounts and a reduced $CO_2$ production amount as compared with the first mixed gas, and thus, may be confirmed to have an advantageous effect in terms of the syngas manufacturing yield and the environmental pollution prevention.

However, in Comparative Examples 1 and 2, since the reverse Boudouard reaction was not performed, it was confirmed that the $H_2$ and CO production amounts were reduced and also the $CO_2$ production amount was significantly increased by about 60 wt % or more, as compared with those of the final syngas which had undergone WGS of Examples 1 and 2.

The method and the apparatus for manufacturing syngas according to the present disclosure may have a significantly improved manufacturing yield of syngas from organic waste.

The method and the apparatus for manufacturing syngas according to the present disclosure may minimize carbon dioxide formation in a syngas manufacturing process.

The method and the apparatus for manufacturing syngas according to the present disclosure may also induce an effect of regenerating a waste catalyst in a process of converting carbon dioxide into carbon monoxide to improve process efficiency.

Hereinabove, although the present disclosure has been described by specific matters, limited implementations, and drawings, they have been provided only for assisting the entire understanding of the present disclosure, and the present disclosure is not limited to the implementations, and various modifications and changes may be made by those skilled in the art to which the present disclosure pertains from the description.

Therefore, the spirit of the present disclosure should not be limited to the above-described implementations, and the following claims as well as all modifications equal or equivalent to the claims are intended to fall within the scope and spirit of the disclosure.

What is claimed is:

1. A method for reducing greenhouse gas emission in the manufacture of syngas, the method comprising the steps of:
    (S1) heat-treating organic waste in a first reactor to produce a first mixed gas, which comprises methane, hydrogen, carbon monoxide, and carbon dioxide;
    (S2) introducing the first mixed gas to a second reactor and subjecting it to methane reforming in the presence of a catalyst to produce a second mixed gas;
    (S3) separating the catalyst and carbon dioxide from the second mixed gas and recovering a third mixed gas from which the catalyst and the carbon dioxide have been removed;
    (S4) introducing the carbon dioxide separated in step (S3) to a third reactor and converting the carbon dioxide into carbon monoxide through a reverse Boudouard reaction; and
    (S5) mixing the third mixed gas recovered in step (S3) and the carbon monoxide converted in step (S4) to produce syngas,
    wherein (S4) further comprises the steps of:
    (S4-1) introducing the catalyst separated in step (S3) to the third reactor and regenerating the catalyst through a reverse Boudouard reaction; and
    (S4-2) recirculating and resupplying the regenerated catalyst to step (S2).

2. The method for reducing greenhouse gas emission in the manufacture of syngas of claim 1, wherein the methane reforming in step (S2) comprises any one or two or more reactions selected from a methane pyrolysis reaction, a carbon dioxide reforming reaction, or a water vapor reforming reaction.

3. The method for reducing greenhouse gas emission in the manufacture of syngas of claim 1, wherein the second mixed gas comprises hydrogen, carbon monoxide, and carbon dioxide.

4. The method for reducing greenhouse gas emission in the manufacture of syngas of claim 1, wherein the catalyst of step (S2) is a composite catalyst in which a metal hydride is supported on a carrier.

5. The method for reducing greenhouse gas emission in the manufacture of syngas of claim 4, wherein the metal hydride comprises any one or two or more selected from nickel, vanadium, iron, platinum, palladium, or ruthenium.

6. The method for reducing greenhouse gas emission in the manufacture of syngas of claim 4, wherein the carrier comprises silica, alumina, silica-alumina, carbon, zirconia, titania, zeolite, SAPO, ALPO, and/or mixtures thereof.

7. The method for reducing greenhouse gas emission in the manufacture of syngas of claim 1, wherein step (S2) is performed at a temperature of 500 to 1000° C. and a pressure of 50 to 300 kPa.

8. The method for reducing greenhouse gas emission in the manufacture of syngas of claim 1, wherein step (S4) is performed at a temperature of 600 to 1000° C. and a pressure of 50 to 300 kPa.

9. The method for reducing greenhouse gas emission in the manufacture of syngas of claim 1, further comprising: (S6) performing a water-gas shift reaction.

10. The method for reducing greenhouse gas emission in the manufacture of syngas of claim 1, wherein the gas produced in step (S5) comprises hydrogen and carbon monoxide and a molar ratio between the hydrogen and the carbon monoxide satisfies 1.8:1 to 2.2:1.

11. The method for reducing greenhouse gas emission in the manufacture of syngas of claim 1, wherein the organic waste in step (S1) is any one or two or more selected from waste plastic, solid waste, biomass, waste oil or waste tires, and/or standard plastic garbage bags.

12. The method for reducing greenhouse gas emission in the manufacture of syngas of claim 1, further comprising: before step (S2), purifying the first mixed gas of step (S1).

* * * * *